June 16, 1964
A. W. HAGAN
3,137,458
AIRCRAFT CRASH SIGNAL
Filed May 1, 1961
4 Sheets-Sheet 1
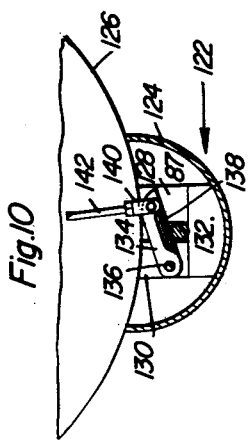
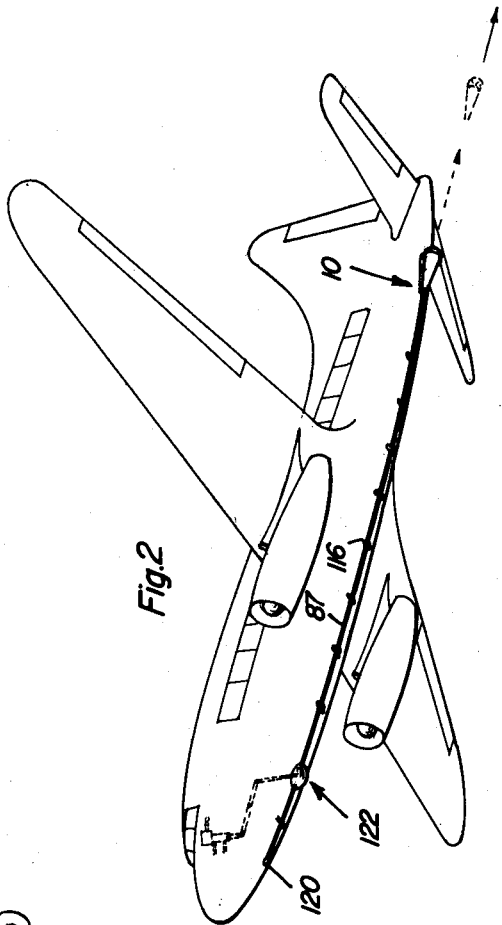
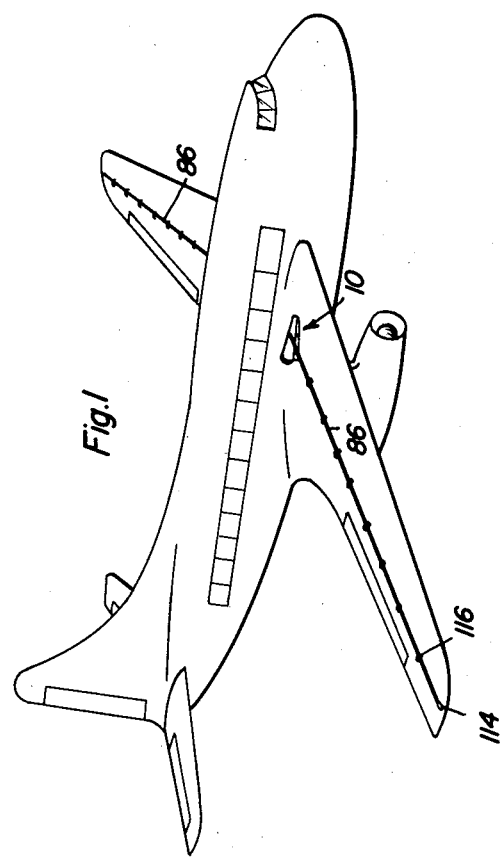
Amuel W. Hagan
INVENTOR.

June 16, 1964   A. W. HAGAN   3,137,458
AIRCRAFT CRASH SIGNAL
Filed May 1, 1961   4 Sheets-Sheet 2
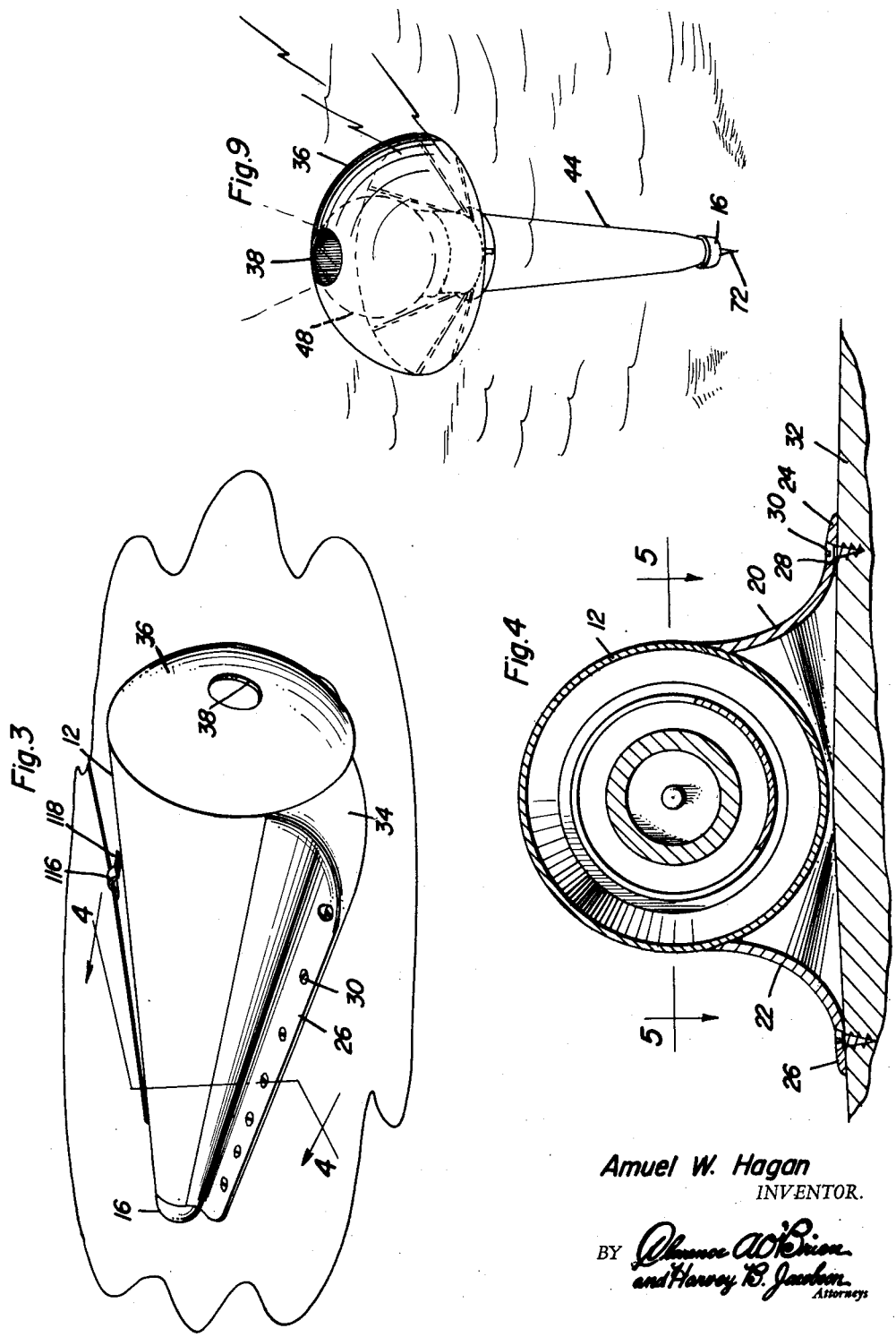
Amuel W. Hagan
INVENTOR.

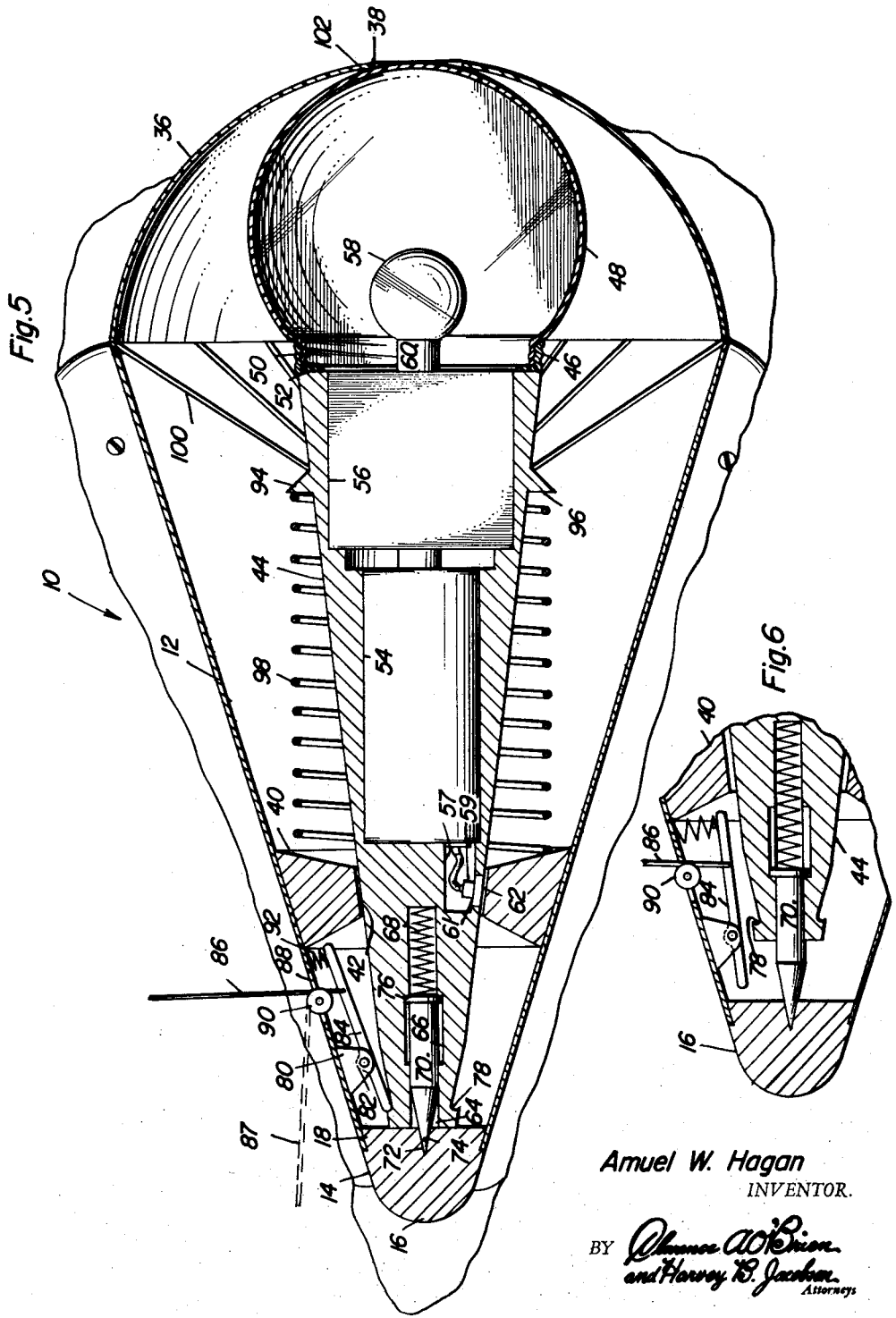

June 16, 1964
A. W. HAGAN
3,137,458
AIRCRAFT CRASH SIGNAL
Filed May 1, 1961
4 Sheets-Sheet 4
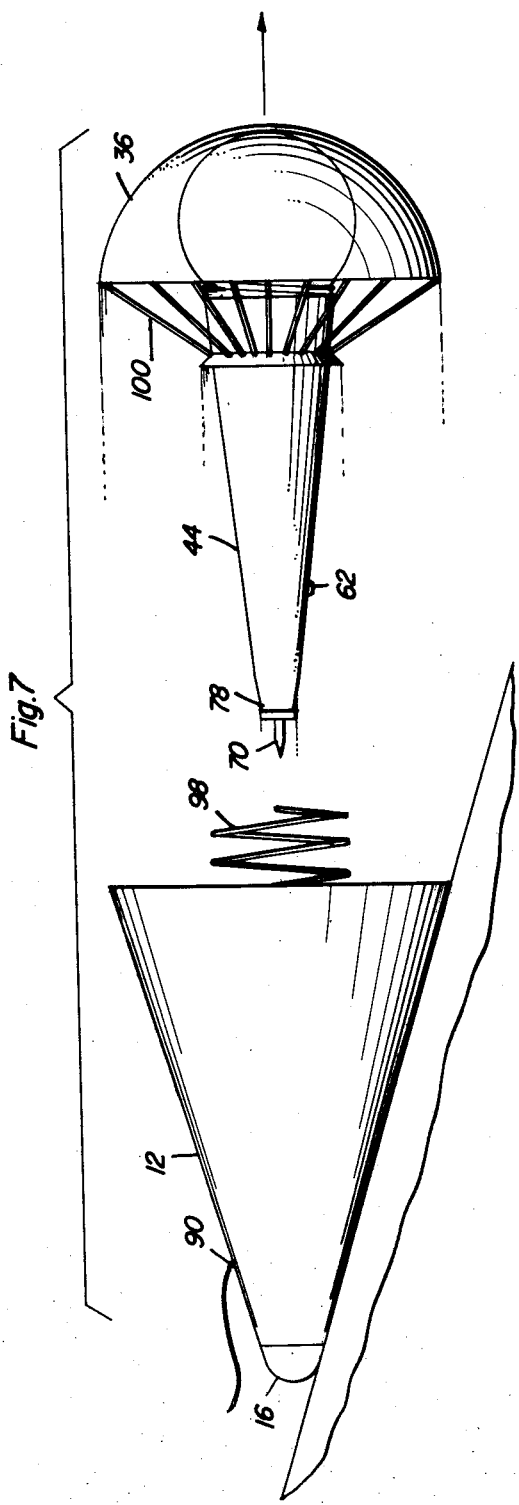
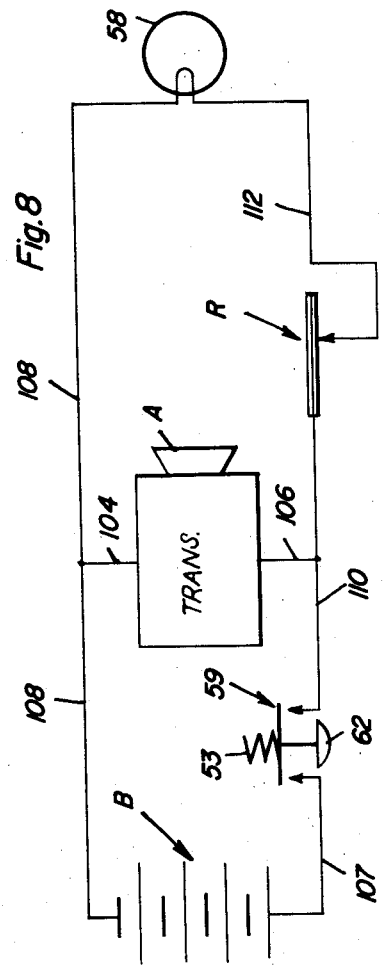
Amuel W. Hagan
INVENTOR.
BY *Clarence A. O'Brien*
*and Harvey B. Jacobson*
Attorneys

United States Patent Office 3,137,458
Patented June 16, 1964

3,137,458
AIRCRAFT CRASH SIGNAL
Amuel W. Hagan, Central City, Ky.
(Box 1335, Owensboro, Ky.)
Filed May 1, 1961, Ser. No. 106,813
6 Claims. (Cl. 244—1)

This invention relates to signal devices, and more particularly to signal devices for indicating the crash or disintegration of an aircraft.

Briefly, the invention comprises a plurality of signal devices mounted on the wings and fuselage of an aircraft. Each signal device comprises a housing enclosing a battery operated radio transmitter and a signal light. When any portion of the wings or fuselage begins to disintegrate, a tension cable extending along the wings or fuselage is ruptured. This rupture of the cable causes actuation of a trigger mechanism so as to release a cocked spring means for ejecting the signal device from the aircraft. After the signal device is ejected, a switch is automatically closed for energizing the radio transmitter and the signal light. A parachute device controls the rate of descent of the signal.

Accordingly, it is a primary object of the invention to provide a signal device which becomes automatically operative upon the disintegration of any major portion of an aircraft.

It is another object of the invention to provide a signal device that may be operated in emergency by the pilot or crew of an aircraft.

It is yet another object of the invention to provide an aircraft signal device which will transmit distress signals that may be received at a great distance from the aircraft.

It is still another object of the invention to provide a signal device for aircraft which will float on water and is provided with a shock absorbing mechanism to cushion its landing when it lands on the earth.

It is still another object of my invention to provide a signal which will automatically indicate the exact location of an aircraft in distress.

It is still another object of the invention to provide a signal device for aircraft in distress which is automatically ejected when the aircraft disintegrates and which is provided with a built-in parachute device for gently lowering the signal device to the surface of the earth.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of an aircraft showing how my signal device is installed on the wings thereof;

FIGURE 2 is a bottom perspective view of the aircraft shown in FIGURE 1 and showing how my signal device is installed on the fuselage of the aircraft;

FIGURE 3 is a close-up view in perspective on an enlarged scale showing my signal device mounted on the surface of an aircraft;

FIGURE 4 is an elevational cross sectional view taken substantially on the plane of line 4—4 in FIGURE 3 and on an enlarged scale;

FIGURE 5 is a cross sectional view taken substantially on the plane of line 5—5 in FIGURE 4;

FIGURE 6 is a view duplicating a portion of FIGURE 5 and showing the trigger mechanism in the released position;

FIGURE 7 is a side view of one of my signal devices illustrating the manner of separation of the signal device and its housing;

FIGURE 8 is an electrical diagram of my signal device;

FIGURE 9 is a perspective view showing how my signal device descends through the air or floats in water; and FIGURE 10 is an elevational cross sectional view taken transversely through the housing enclosing a manually operated cutting means for the fuselage cable controlling one of my signal devices.

Referring to the drawings, and particularly to FIGURES 3 through 5, it can be seen that my signal device 10 comprises a conical housing 12 which is circular in cross-section at any point along its axis. The rear end of the housing 12 is sealed by a conical cap 14 having a rounded end 16 and a recessed portion 18 which extends into the open hollow end of the housing 12 and is connected thereto by a conventional means such as spot welds or screws, not shown. As shown in FIGURES 3 and 4, each side of the conical housing 12 has rigidly secured thereto by conventional means such as welding a concave fairing strip 20 or 22. These fairing strips 20 and 22 are tapered longitudinally and their cross sectional radius of curvature decreases from front to rear so as to blend smoothly with the tapering configuration of the housing 12. The outer edges of these fairings curve outwardly as shown in FIGURE 4 at 24 and 26 and lie in a common plane which is substantially tangent to the bottom surface of the housing 12. Each flange contains a row of spaced apertures 28 which receive sheet metal screws 30 which in turn extend into the aircraft structure 32 for rigidly securing the signal 10 to the aircraft. As shown in FIGURE 3, the nose of each of the fairings is rounded off as shown at 34.

The front of the housing 12 is closed by a semi-spherical dome 36 which has a circular opening 38 in its center and whose edges abut and lie flush with the leading edges of the housing 12.

Referring particularly to FIGURE 5, it can be seen that the housing 12 encloses an annular bearing 40 which is fixed to the inner surface of the housing at its outer periphery and has a circular and conical bearing surface 42 formed by an aperture through the center of the bearing.

Normally extending through and slidably supported in the bearing surface 42 is a signal housing 44. The signal housing 44 like the bearing surface 42 is conical and is circular in cross-section. The forward portion of the housing 44 is secured to a forwardly projecting interiorly threaded flange 46. A dome-shaped globe composed of transparent material such as plastic or glass as shown at 48 has a flange of annular configuration and which is externally threaded as shown at 50. The flange 50 is received within the flange 46 and connected thereto by the interengaging thread means. The end of the flange 50 abuts an annular resilient washer or gasket 52 so as to form a seal between the two flanges. The interior of the housing 44 is substantially hollow and has two adjacent chambers 54 and 56 which contain a battery and radio transmitter respectively. The battery and radio transmitter are of conventional design and structure, and are secured within the chambers 54 and 56 by conventional means. A conventional electric bulb 58 is mounted in a socket 60 which is secured to the forward portion of the housing for the ratio transmitter. The rear of the battery chamber 54 connects with a switch chamber 57 which contains a conventional button switch 59.

The button switch 59 has an annular portion 61 which is secured in a circular hole extending from the outer surface of the housing 44 into the chamber 57.

As shown in FIGURE 5, the switch button 62 is normally pressed inwardly by the bearing surface 42 so as to operate the switch to an open position. The button 62 is urged outwardly by an internal spring, not shown, and when urged to the outward position, the switch is in on position.

The rear of the housing 44 contains an axial bore 64 which is enlarged in a central portion as shown at 66. The forward portion of the bore 64 contains a coil spring 68 and the rear portion thereof contains a sliding plunger 70. The rear end of the plunger 70 has a conical point 72 which normally is received in a conical aperture or seat 74 in the plug 16. The forward end of the plunger 70 has a circular flange 76 formed thereon which is slidable in the enlarged bore portion 66, and normally abuts the forward annular end wall of the bore 66 as shown in FIGURE 5. When the flange 76 is in its forward position, the coil spring 68 is highly compressed.

The rear outer end surface of the housing 44 is formed with an annular notch 78. A conical support 80 is fixed to the rear inner surface of the housing 12 and projects inwardly therefrom. Mounted on the inner end of the support 80 at its central portion by means of a pin 82 is a lever 84. The rear end of the lever 84 is normally received in the notch 78 and the forward end thereof is connected to a flexible cable 86. Adjacent the forward end of the lever 84 is a rectangular aperture 88 formed in the housing 12. A pulley 90 having a grooved periphery is rotatably mounted in the aperture 88. The cable 86 extends through the aperture 88 and over the outer surface of the groove pulley 90. A coil spring 92 is compressed between the forward end of the lever 84 and the inner surface of the housing 12 so as to urge the lever in a clockwise direction of rotation as shown in FIGURE 5. However, in a manner more clearly explained below, the cable 86 urges the lever 84 to rotate in a counterclockwise direction so as to maintain the spring 92 compressed and the rear end of the lever 84 within the groove 78.

The forward portion of the signal housing 44 is formed with an annular flange 94 having a rear radially extending abutment surface 96. A relatively powerful ejection spring 98 of the coil type is compressed between the abutment surface 96 and the bearing 40 so as to urge the signal housing to the right as viewed in FIGURE 5.

The dome 36 also functions as a parachute canopy in a manner more fully explained below, and is connected to the signal housing 44 by a plurality of circumferentially spaced struts 100. The struts 100 maintain the canopy 36 in tight engagement with the globe 48. An annular gasket 102 encircles the inner periphery of the hole 38 and is compressed between the globe 48 and the canopy 36 so as to form a sealing means for the hole 38.

As shown in FIGURE 8, the radio transmitter is connected by leads 104 and 106 to the leads 108 and 110 respectively. The lead 108 is connected between the battery B and the electric bulb 58. The lead 110 extends between the switch 59 and a rheostat R. The rheostat in turn, is connected by a lead 112 to the bulb 58.

As shown in FIGURE 1, one of my signal devices 10 is preferably mounted on the root of each wing semi-span. The cable 86 is connected at its inner end to the lever 84 as shown in FIGURE 5, and as shown in FIGURE 1 it extends outwardly along the central portion of the wing to the tip thereof where it is secured at 114. The securing means 114 maintains the cable taut and under a substantial amount of tension so as to maintain the end of the lever 84 in the groove 78. The cable 86 is maintained relative close to the wing surface by means of a plurality of U-shaped guides 116 which are secured to the surface of an aircraft by end flanges 118 as shown in FIGURE 3. Also, it is apparent that the cables 86 as well as the cable 87 shown in FIGURE 2 could be extended inside of the wing or inside of the fuselage.

As shown in FIGURE 2, a signal 10 is also mounted on the lower rear surface of the fuselage of the aircraft, and this signal has a cable 87 extending along the belly of the aircraft fuselage to the nose thereof where it is secured at 120. The cable 87 is also maintained taut and is held slidably next to the fuselage skin by means of the cable guides 116 which are shown more in detail in FIGURE 3.

Referring particularly to FIGURES 2 and 10, it can be seen that I provide at 122 a device for willfully severing the cable 87. The severing device 122 comprises a streamline housing 124 secured to the lower surface of the fuselage 126. Spaced support plates 128 and 130 extend downwardly from the fuselage surface 126 and are connected at their lower ends to a chopping block 132. The cable 87 extends between the supports 130 and 128 and contacts the upper surface of the chopping block 132. The blade 134 is pivoted at 136 to the support 130 and has a sharp cutting edge 138. The free end of the blade 134 is pivotally connected by means of a yoke 140 to an operating link 142 which extends to the cockpit and is connected to an operating lever whereby the pilot may force the link 142 and blade 134 downwardly so that the cutting edge 138 will severe the cable 87 for releasing the signal 10 mounted at the rear of the fuselage.

Normally the two cables 86 and the cable 87 are maintained taut so that the levers 84 within the three signals have one of their ends urged into engagement with the abutment groove 78. Each lever 84 thus prevents movement of the signal housing 44 relative to the outer housing 12. However, if the aircraft should crash or disintegrate in flight, it is apparent that at least one of the cables 86 or 87 would be broken or loosened thereby permitting the compression coil spring 92 to rotate the lever 84 in a clockwise direction and viewed in FIGURE 5 so that the lever would become disengaged from the abutment grooves 78 of the signal housing 44. As soon as the lever 84 disengages from the groove 78, the compressed coil springs 98 and 68 eject the housing 44 from the outer housing 12 with terrific speed as illustrated in FIGURES 6 and 7. FIGURE 2 also illustrates how the signal would be ejected from the housing 12 at the rear of the fuselage. As soon as the signal housing 44 is ejected, the spring 53 for the switch 59 urges the button 62 in an outward direction from the housing 44 so as to close the switch 59.

As shown in FIGURE 8, it is apparent that as soon as the switch 59 closes, the radii transmitter is energized by means of the battery B and the leads 108, 104, 106, 110 and 107. At the same time, the bulb 58 is energized by means of the leads 108 and 112, and the blinker switch R. The radio transmitter may be provided with a built-in aerial as indicated at A which is preferably built in the parachute 36. Also, it is preferable that the radio transmitter contain a built-in device for causing it to transmit a distress code. It is apparent, that as soon as the radio transmitter begins to transmit its signal on the pre-set frequency, that this signal may be received by remote radio receivers so that rescue operations and search procedures may begin immediately. The location of the signal device and aircraft may be easily determined by two or more receivers homing in on the signal transmitted by the transmitter of the signal 10.

The parachute canopy 36 is rigid and is preferably formed of transparent plastic, fiber glass or similar material colored red or clear. If the material is opaque, the light emitted by the blinking bulb 58 may be observed through the aperture or hole 38. Preferably, the globe 48 is colored red so that a red light will be transmitted through the hole 38.

As shown in FIGURE 9, once the signal housing 44 has been ejected, its pointed end 16 will point downwardly since its upper end will be suspended on the parachute canopy 36 by means of the struts 100. If the device should land in water, it will still maintain the position illustrated in FIGURE 9 due to the relatively dense structure of the housing 44 and the extreme lightweight of the globe 48. Since the globe 48 is filled with air and is sealed, it will cause the entire structure to float on the surface of the water where it will continue to operate by means of its radio and flashing light bulb.

If the housing 44 should strike the surface of the earth, the pointed end 72 of the plunger 70 will penetrate the ground and thus act as a shock absorber or a brake means for gradually decelerating the speed of the signal device. The braking action of the pin 72 is caused by friction between it and the soil as it moves through the soil. Also, when the plunger 70 strikes the ground, it will be forced upwardly in relation to the housing 44 so as to again compress the spring 68 until it strikes the end wall of the bore 66. It is thus apparent that the coil spring 68 also acts as a shock absorber for decelerating the signal device. Since the plunger 72 penetrates the ground, it will also maintain the housing 44 in vertical position as illustrated in FIGURE 9 so that the light emitted at 38 and through the transparent parachute 36 may be readily observed from the air.

While the signal devices have been shown in FIGURES 1 and 2 as being mounted on the aircraft with their pointed ends directly forwardly, it is apparent that these devices could just as well be mounted with their pointed ends directed toward the rear of the aircraft so that the signal devices could be ejected forwardly of the aircraft. Also, the signal devices may be completely recessed within the wings and fuselage and the cables may extend inside the aircraft structure.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A signal for aircraft comprising an outer housing adapted to be secured to the aircraft, an inner housing containing signal means within said outer housing, releasable means for securing said inner housing to said outer housing, power means connected to said inner housing for ejecting it from said outer housing, automatic means arranged to cause said signal means to emit signals when said inner housing is ejected, and operating means responsive to disintegration of the aircraft to cause said releasable means to release said inner housing wherein it may be ejected from the outer housing by said power means, said inner housing being connected to a parachute and shock absorbing means for cushioning its impact with the earth.

2. A signal for aircraft comprising an outer housing adapted to be secured to the aircraft, an inner housing containing signal means within said outer housing, releasable means for securing said inner housing to said outer housing, power means connected to said inner housing for ejecting it from said outer housing, automatic means arranged to cause said signal means to emit signals when said inner housing is ejected, said inner housing being weighted in a manner that a portion thereof will be disposed lowermost when said inner housing is falling free, said power means including cushioning means carried by said portion of said housing for also cushioning the impact of the inner housing on a hard surface.

3. The combination of claim 2 wherein said cushioning means comprises a member movable between an extended position with a portion thereof projecting downwardly below the remainder of said inner housing when the latter is falling free and a retracted position with said portion displaced upwardly away from said extended limit position, and means normally yieldably urging said member toward said extended limit position.

4. The combination of claim 3 wherein the lowermost end of said member is shaped to partially penetrate a hard surface on which said inner housing falls.

5. A signal for aircraft comprising an outer housing adapted to be secured to the aircraft, an inner housing containing signal means within said outer housing, releasable means for securing said inner housing to said outer housing, power means connected to said inner housing for ejecting it from said outer housing, automatic means arranged to cause said signal means to emit signals when said inner housing is ejected, said outer housing defining a generally conical seat, said inner housing including a conical member seatingly engageable in said seat and movable between limit positions relative to said inner housing in opposite directions generally paralleling the direction in which said inner housing may be ejected from said outer housing, means yieldingly urging said conical member in a direction opposite to the direction of ejection of said inner housing and thereby comprising a portion of said power means.

6. The combination of claim 5 wherein said conical member is pointed in said opposite direction and said inner housing is weighted to fall free with said conical member disposed lowermost and pointing downwardly.

References Cited in the file of this patent

UNITED STATES PATENTS

| | | |
|---|---|---|
| 1,836,495 | Paulson | Dec. 15, 1931 |
| 2,317,285 | Marple | Apr. 20, 1943 |
| 2,473,050 | Camp | June 14, 1949 |
| 2,500,809 | Fennessy et al. | Mar. 14, 1950 |
| 2,992,793 | Devantier | July 18, 1961 |

FOREIGN PATENTS

| | | |
|---|---|---|
| 1,082,130 | Germany | May 19, 1960 |